United States Patent
Kim et al.

(10) Patent No.: US 9,660,766 B2
(45) Date of Patent: May 23, 2017

(54) ROBUST SYMBOL TRANSMISSION AND RECEPTION METHOD USING HIERARCHICAL MODULATION IN WIRELESS ACCESS SYSTEM

(71) Applicant: LG ELECTRONICS INC., Seoul (KR)

(72) Inventors: Jinmin Kim, Seoul (KR); Kwangseok Noh, Seoul (KR); Kukheon Choi, Seoul (KR); Jaehoon Chung, Seoul (KR); Kitae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/905,247

(22) PCT Filed: Jul. 18, 2014

(86) PCT No.: PCT/KR2014/006537
§ 371 (c)(1),
(2) Date: Jan. 14, 2016

(87) PCT Pub. No.: WO2015/009101
PCT Pub. Date: Jan. 22, 2015

(65) Prior Publication Data
US 2016/0149670 A1 May 26, 2016

Related U.S. Application Data

(60) Provisional application No. 61/856,037, filed on Jul. 18, 2013.

(51) Int. Cl.
*H04B 7/06* (2006.01)
*H04L 1/06* (2006.01)
(Continued)

(52) U.S. Cl.
CPC ........ *H04L 1/0618* (2013.01); *H04L 27/3488* (2013.01); *H04W 24/02* (2013.01); *H04B 7/0669* (2013.01); *H04B 7/0697* (2013.01)

(58) Field of Classification Search
CPC . H04L 1/0618; H04L 27/3488; H04B 7/0669; H04B 7/0697; H04W 24/02
(Continued)

(56) References Cited

U.S. PATENT DOCUMENTS

| | | | |
|---|---|---|---|
| 2005/0068918 A1* | 3/2005 | Mantravadi | H04B 7/0669 370/328 |
| 2007/0195907 A1 | 8/2007 | Wang et al. | |

(Continued)

FOREIGN PATENT DOCUMENTS

KR    10-2010-0012897    2/2010

OTHER PUBLICATIONS

PCT International Application No. PCT/KR2014/006537, Written Opinion of the International Searching Authority dated Nov. 3, 2014, 22 pages.

(Continued)

*Primary Examiner* — Michael Neff
(74) *Attorney, Agent, or Firm* — Lee Hong Degerman Kang Waimey

(57) ABSTRACT

The present invention provides hierarchical modulation methods for robust symbol transmission and reception in a wireless access system, and devices supporting same. A method for transmitting a hierarchically modulated (HM) symbol in a wireless access system, according to an embodiment of the present invention, comprises the steps of: generating a first symbol; generating a second symbol; generating an HM symbol by combining the first symbol and the second symbol; and transmitting the HM symbol, wherein the first symbol can be generated by means of a spatial multiplexing (SM) technique, a beam-forming technique, or a space-time coding technique and the second (Continued)

symbol can be generated by means of a spatial multiplexing (SM) technique, a beam-forming technique, or a space-time coding technique.

8 Claims, 15 Drawing Sheets

(51) Int. Cl.
    *H04L 27/34*     (2006.01)
    *H04W 24/02*     (2009.01)

(58) Field of Classification Search
    USPC .......................................................... 375/267
    See application file for complete search history.

(56) References Cited

U.S. PATENT DOCUMENTS

| | | |
|---|---|---|
| 2007/0270170 A1 | 11/2007 | Yoon et al. |
| 2008/0159430 A1 | 7/2008 | Steer et al. |
| 2010/0195526 A1 | 8/2010 | Stauffer et al. |
| 2010/0322350 A1 | 12/2010 | Malladi |
| 2012/0076204 A1 | 3/2012 | Raveendran et al. |
| 2012/0189082 A1* | 7/2012 | Zhang ................. H04B 7/0452 375/299 |
| 2013/0034049 A1 | 2/2013 | Jia et al. |

OTHER PUBLICATIONS

European Patent Office Application Serial No. 14826055.7, Search Report dated Jan. 30, 2017, 8 pages.

* cited by examiner

FIG. 13
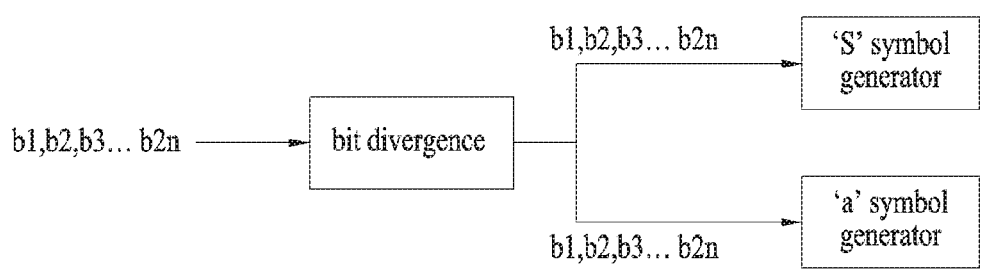
(a)
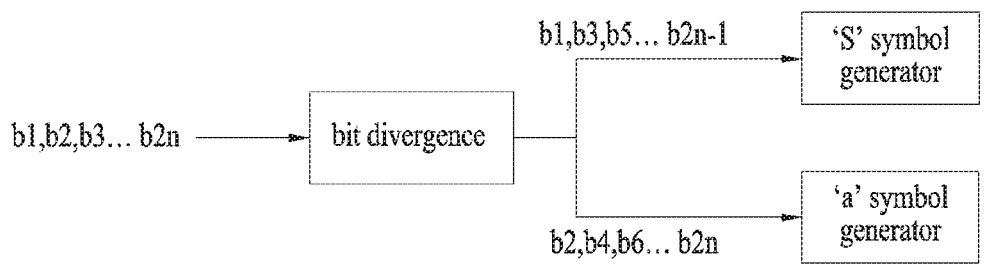
(b)

ROBUST SYMBOL TRANSMISSION AND RECEPTION METHOD USING HIERARCHICAL MODULATION IN WIRELESS ACCESS SYSTEM

CROSS-REFERENCE TO RELATED APPLICATIONS

This application is the National Stage filing under 35 U.S.C. 371 of International Application No. PCT/KR2014/006537, filed on Jul. 18, 2014, which claims the benefit of U.S. Provisional Application No. 61/856,037, filed on Jul. 18, 2013, the contents of which are all hereby incorporated by reference herein in their entirety.

TECHNICAL FIELD

The present invention relates to hierarchical modulation methods for robust symbol transmission and reception in a wireless access system and devices supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method for reliable communication.

Another object of the present invention is to provide a method for configuring hierarchical symbols.

Still another object of the present invention is to provide a method for configuring symbols suitable for various channels by varying transmission schemes applied to hierarchically configured symbols or symbol configuration methods during configuration of hierarchical symbols.

Further still another object of the present invention is to provide devices for supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides hierarchical modulation methods for robust symbol transmission and reception in a wireless access system and devices supporting the same.

In one aspect of the present invention, a method for transmitting hierarchically modulated (HM) symbols in a wireless access system comprises the steps of configuring a first symbol; configuring a second symbol; configuring the HM symbols by combining the first symbol and the second symbol; and transmitting the HM symbols, wherein the first symbol is configured by applying a spatial multiplexing (SM) scheme, a beamforming scheme, or a space time coding scheme, and the second symbol is configured by applying a spatial multiplexing (SM) scheme, a beamforming scheme, or a space time coding scheme.

In another aspect of the present invention, a transmission end for transmitting hierarchically modulated (HM) symbols in a wireless access system comprises a transmitter; and a processor configuring and transmitting the HM symbols, wherein the processor is configured to configure a first symbol, configure a second symbol, configure the HM symbols by combining of the first symbol and the second symbol, and transmit the HM symbols by controlling the transmitter, and wherein the first symbol is configured by applying a spatial multiplexing (SM) scheme, a beamforming scheme, or a space time coding scheme, and the second symbol is configured by applying a spatial multiplexing (SM) scheme, a beamforming scheme, or a space time coding scheme.

A scheme applied to the first symbol and a scheme applied to the second symbol are different from each other.

Information bits modulated to the first symbol are different from information bits modulated to the second symbol.

Alternatively, information bits modulated to the first symbol are same as information bits modulated to the second symbol.

Also, a receiver for information bits modulated to the first symbol is different from a receiver for information bits modulated to the second symbol.

Also, a modulation scheme of the first symbol is different from that of the second symbol.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First of all, reliable communication can be performed in the wireless communication system.

Secondly, transmission schemes applied to hierarchically configured symbols or symbol configuration methods can be varied, whereby robust symbols can be configured for various channels.

Thirdly, hierarchical symbols configured through the embodiments of the present invention can be transmitted such that robust data service can be provided even in a radio channel environment where a channel status is rapidly changed.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIGS. 12 and 13 illustrate methods for configuring information bits constituting a symbols and S symbols;

BEST MODE FOR CARRYING OUT THE INVENTION

Figure 1:
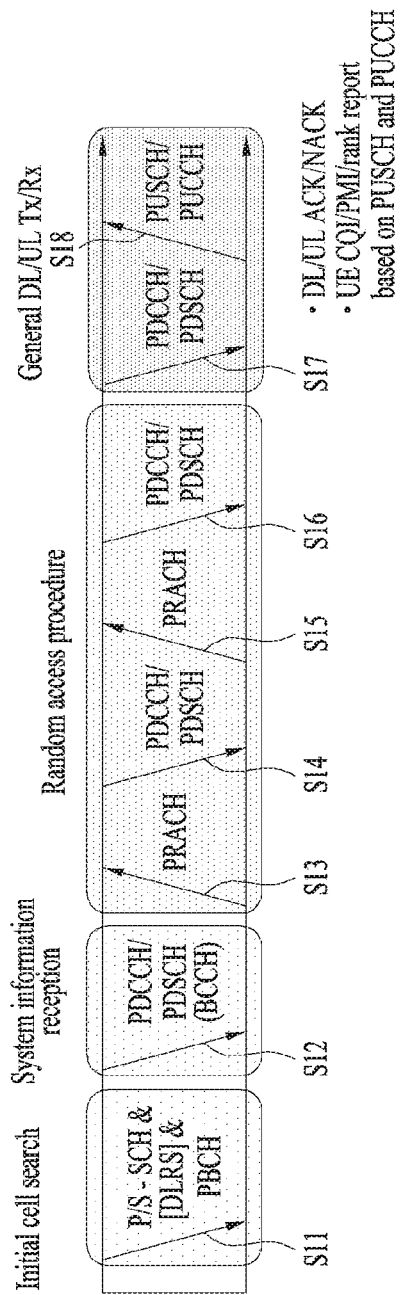
FIG. 1 illustrates physical channels and a general signal transmission method using the physical channels, which may be used in embodiments of the present invention.

The present invention described hereinafter provides hierarchical modulation methods for robust symbol transmission and reception in a wireless access system and devices supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided least it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1.3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
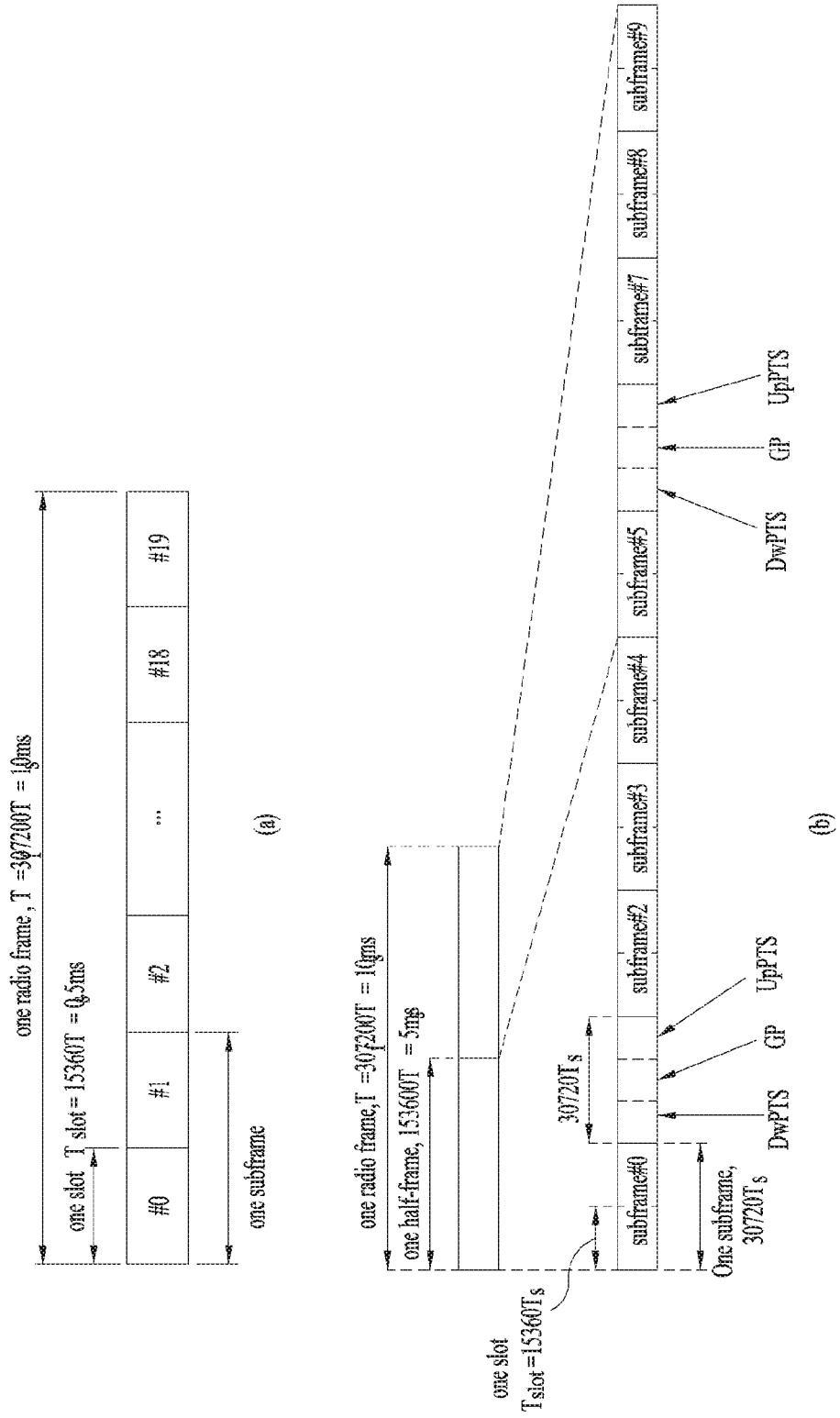
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s=1/(15\text{kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15\text{kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 1-continued

| | | Normal cyclic prefix in downlink | | | Extended cyclic prefix in downlink | | |
|---|---|---|---|---|---|---|---|
| | | | UpPTS | | | UpPTS | |
| | | Normal | Extended | | | Normal | Extended |
| Special subframe configuration | DwPTS | cyclic prefix in uplink | cyclic prefix in uplink | DwPTS | | cyclic prefix in uplink | cyclic prefix in uplink |
| 3 | 24144 · $T_s$ | | | 25600 · $T_s$ | | | |
| 4 | 26336 · $T_s$ | | | 7680 · $T_s$ | | 4384 · $T_s$ | 5120 · $T_s$ |
| 5 | 6592 · $T_s$ | 4384 · $T_s$ | 5120 · $T_s$ | 20480 · $T_s$ | | | |
| 6 | 19760 · $T_s$ | | | 23040 · $T_s$ | | | |
| 7 | 21952 · $T_s$ | | | — | | — | — |
| 8 | 24144 · $T_s$ | | | — | | — | — |

Figure 3:
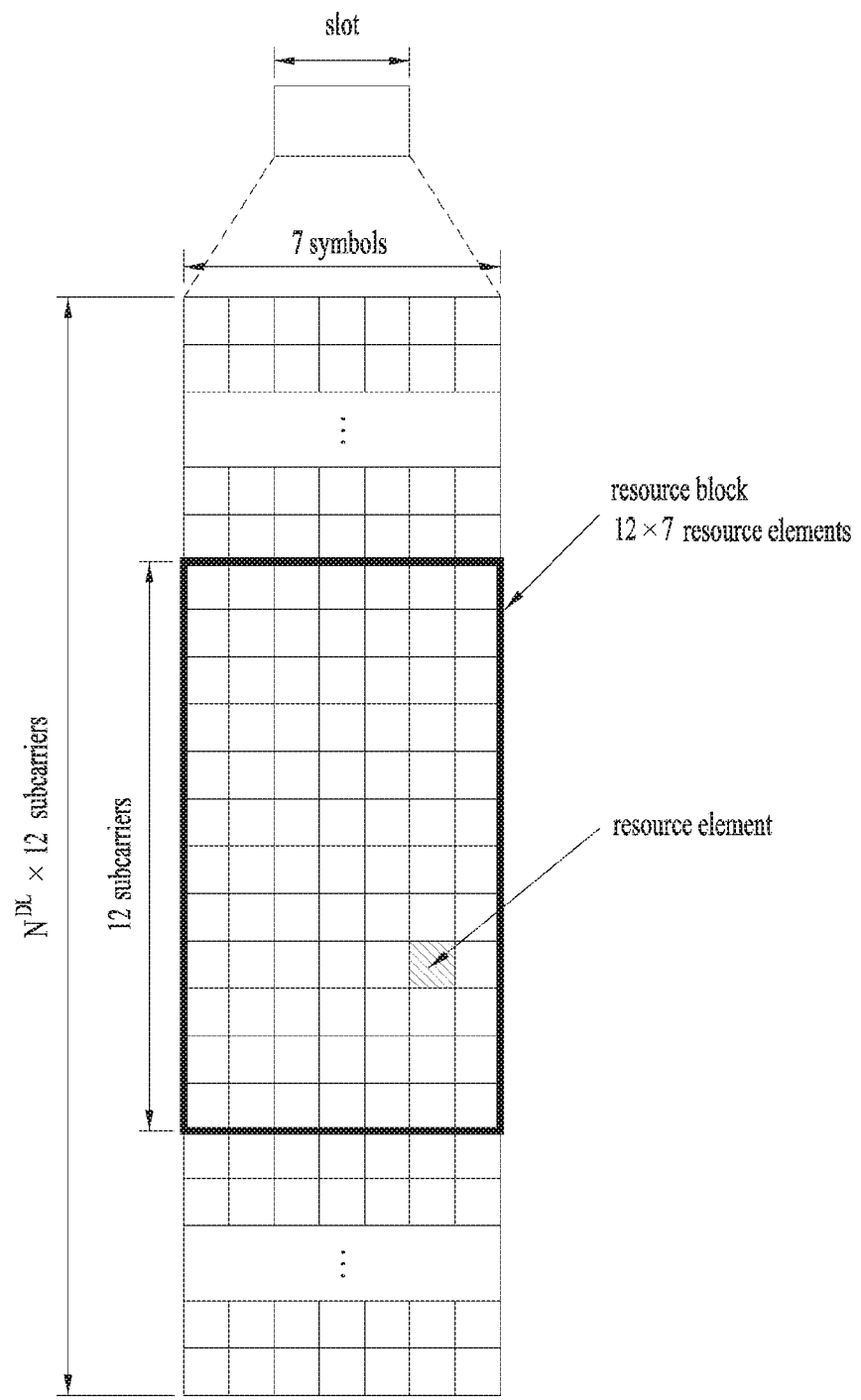
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
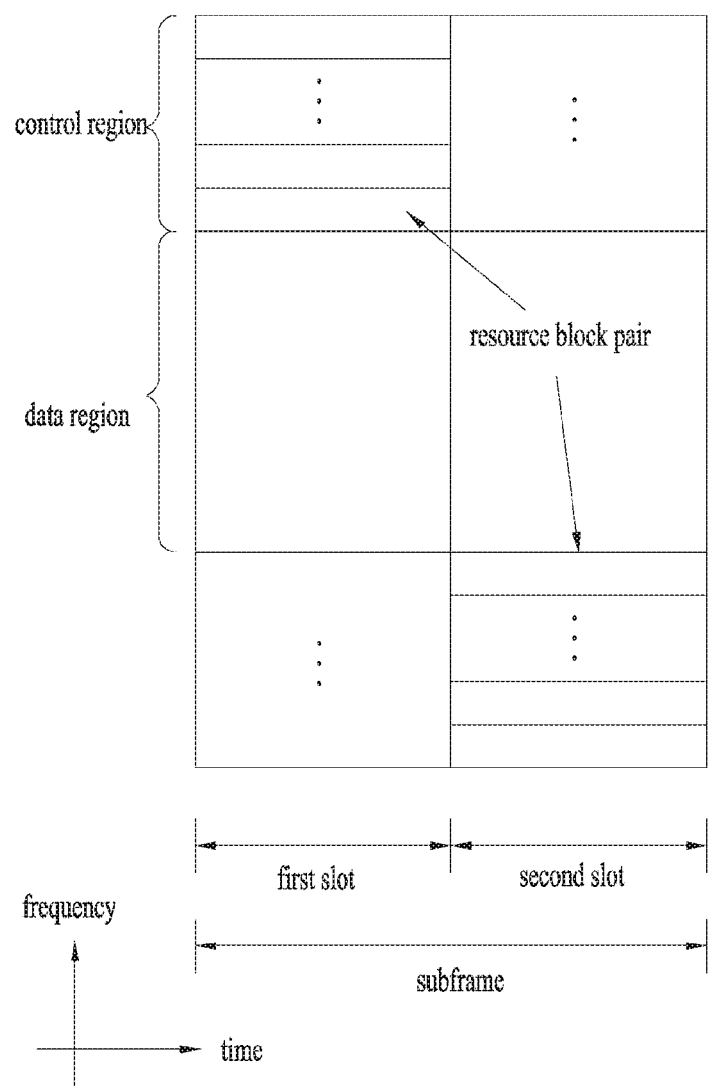
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
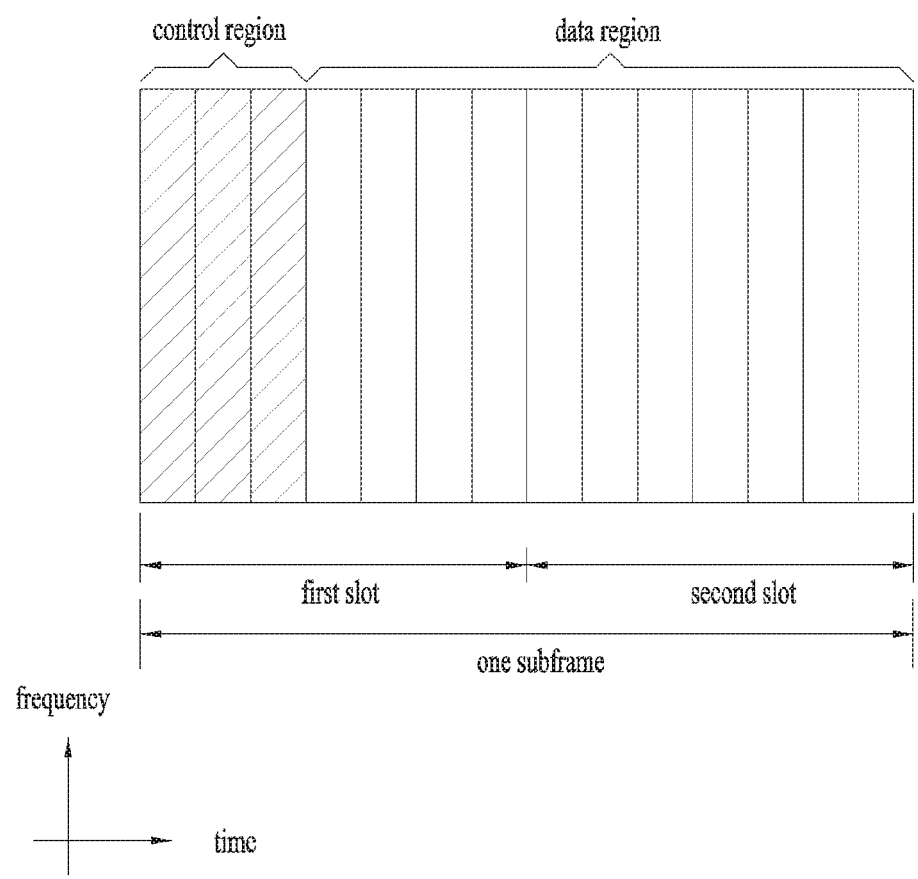
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation.

The term CA is interchangeable with carrier combining, bandwidth aggregation, spectrum aggregation, etc. The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
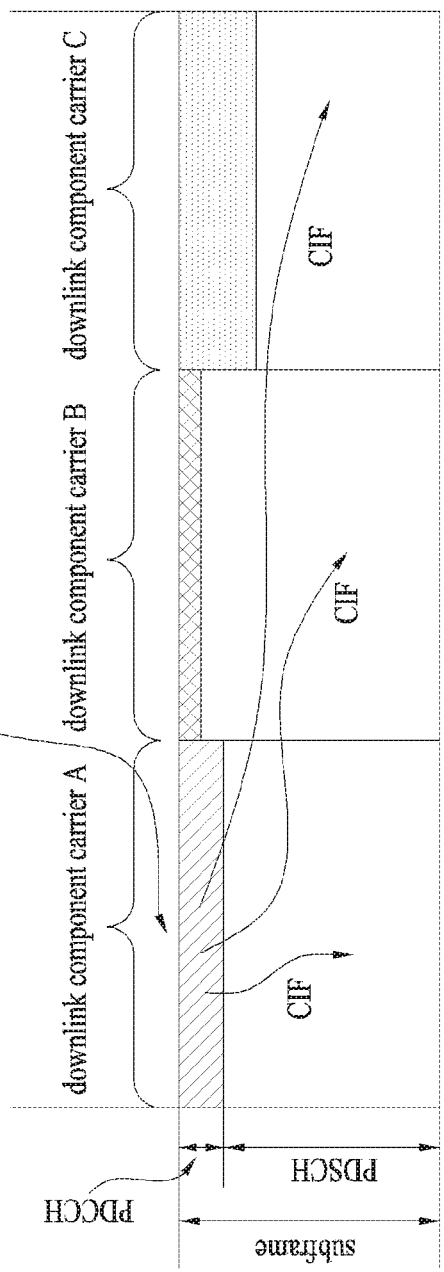
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Robust Symbol Transmission and Reception Method

In a small cell environment, cell coverage of a small cell is very smaller (for example, several m radiuses to several tens of m radiuses) than cell coverage of a macro cell. A shading effect that reaches a user equipment (UE) through buildings may rapidly be changed depending on a location of the UE, or a line of sight (LOS)/non-LOS environment may easily be changed.

Figure 7:
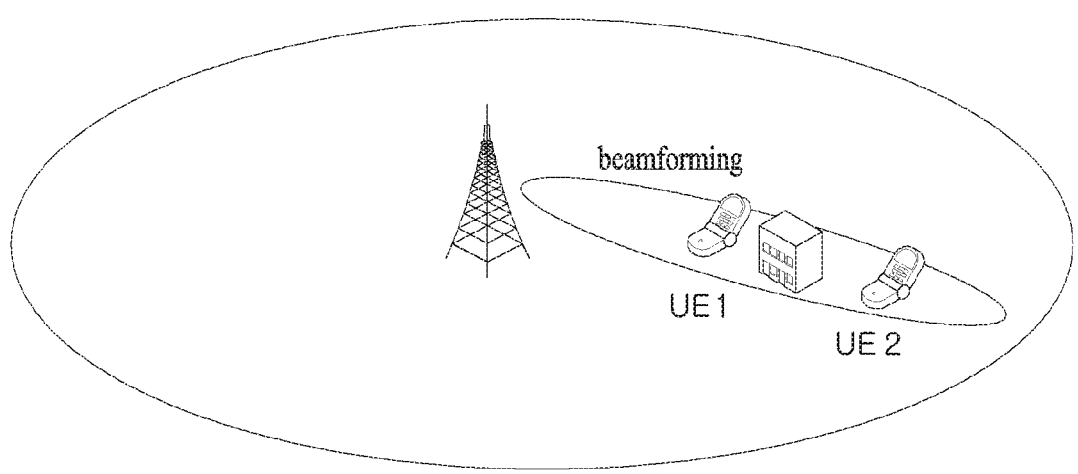
FIG. 7 illustrates an example of a case where SNRs between user equipments are different from each other when a base station performs beamforming.

Also, even in a high frequency wireless communication system, cell coverage is small due to features of high frequency, and the same status as that occurring in the aforementioned small cell may occur. Also, in the case that a base station performs beamforming to improve reception performance of the UE, UEs located on the same line may have their respective SNRs (signal to noise ratios) different from each other. FIG. 7 illustrates an example of a case where SNRs between UEs are different from each other when a base station performs beamforming. Referring to FIG. 7, in the case that the base station transmits a signal towards UE1 and UE2 by performing beamforming, it is noted that the UE1 can assure LOS to acquire a signal of good quality, whereas the UE2 cannot assure LOS due to buildings and receives a signal of poor quality due to a non-LOS environment.

Therefore, the embodiments of the present invention, which will be described hereinafter, relate to efficient data symbol transmission and reception methods robust to a rapid change of a channel status, for supporting multiple users.

3.1 Hierarchical Modulation Method

Figure 8:
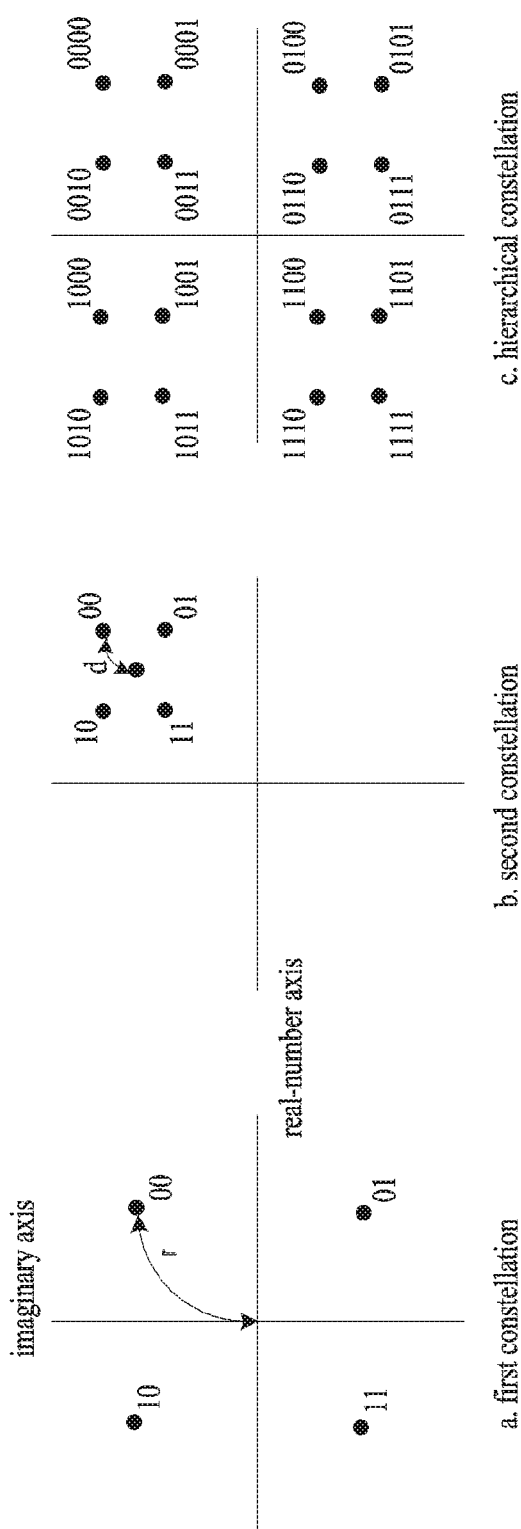
FIG. 8 illustrates an example of a hierarchical modulation method.

FIG. 8 illustrates an example of a hierarchical modulation method.

An example of a hierarchical modulation (HM) method will be described with reference to FIG. 8. In a constellation of FIG. 8, data bits are configured as a constellation of quadrature amplitude modulation (QAM). FIG. 8(a) illustrates that data bits are configured in quadrature phase shift keying (QPSK) or 4 QAM. A constellation of a higher order may be used, or data bits may be configured using differential M-PSK or another modulation method. In FIG. 8(a), a distance from a starting point to each symbol is defined as 'r'.

FIG. 8(b) illustrates that data bits are configured in QPSK or 4 QAM based on a reference point of a first quadrant of FIG. 8(a). In this case, a distance from the reference point to a point of FIG. 8(b) is defined as 'd'. FIG. 8(c) illustrates a constellation finally constituting hierarchical modulation (HM). The constellation of FIG. 8(c) is configured similarly to a constellation of 16 QAM.

Figure 9:
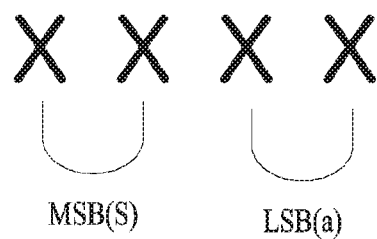
FIG. 9 illustrates an example of bit configuration of HM symbols.

The HM method is advantageous in that robustness of an error of the least significant bit (LSB) and the most significant bit (MSB), which constitute one symbol, can be configured differentially. The constellation of FIG. 8(a) is comprised of 4 points and thus can be expressed by 2 bits. At this time, each point is defined as 'S' symbol. The constellation of FIG. 8(b) is also comprised of 4 points and thus can be expressed by 2 bits. At this time, each point is defined as 'a' symbol. Therefore, one point of FIG. 8(c) can finally be expressed by 4 bits as shown in FIG. 9. FIG. 9 illustrates an example of bit configuration of HM symbols. In FIG. 9, X means each bit. Although FIG. 9 illustrates that 4 bits are used, various sized bits such as 6 bits, 8 bits, 10 bits and 16 bits may be used for MH symbol configuration. At this time, modulation orders different from each other can be applied to the 'S' symbol and the 'a' symbol.

In the HM method, the constellation may be configured such that the distance of 'r' may be greater than the distance of 'd'. Therefore, the bits constituting the 'S' symbols are robuster to an error than the bits constituting the 'a' symbols. This is because that a Euclidian distance of the 'S' symbols is greater than that of the 'a' symbols. If the constellation is configured such that the distance of 'r' is smaller than the distance of 'd', robustness of the bits constituting the 'a' symbols will be greater than that of the bits constituting the 'S' symbols.

Therefore, in the embodiments of the present invention, each symbol configuration method and/or transmission scheme is varied during configuration of HM, whereby data symbols can be transmitted and received with robustness in various channel statuses.

In the embodiments of the present invention, the 'S' symbol may be defined as a first symbol or first sub-symbol, and the 'a' symbol may be defined as a second symbol or second sub-symbol.

3.2 Method for Configuring S Symbols

Hereinafter, methods for configuring S symbols during application of HM method will be described. In the embodiments of the present invention, for convenience of description, an environment where two transmitting antennas and one receiving antenna are used will be described exemplarily. However, the embodiments of the present invention may be applied to even an environment where m number of transmitting antennas and n number of transmitting antennas are used (m and n are integers).

Figure 10:
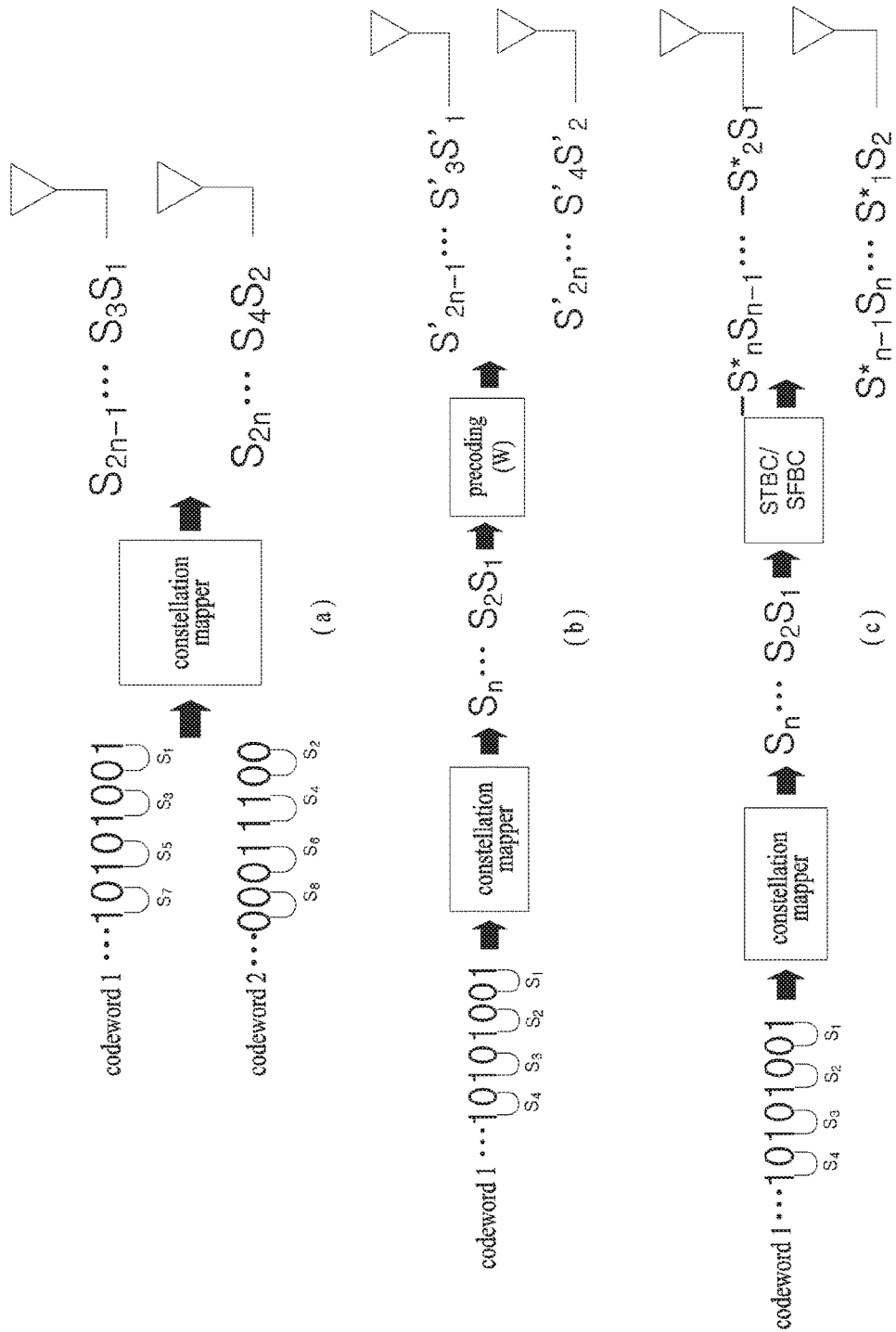
FIG. 10 illustrates methods for configuring S symbols.

FIG. 10 illustrates methods for configuring S symbols.

FIG. 10(a) illustrates that S symbols to be transmitted to two transmitting antennas are generated when the number of streams or codewords to be forwarded to a first user equipment (UE1). At this time, the S symbols which will be transmitted from each transmitting antenna may be configured using a spatial multiplexing (SM) scheme. For example, the transmitting antenna may configure the S symbols by using different types of information bits, wherein the generated S symbols may be mapped into one point of constellations the same as or different from each other.

Although FIG. 10(a) illustrates that the number of codewords is 2, the number of codewords may be 1 or 3. However, data bits constituting each S symbol should be different from each other.

FIG. 10(b) illustrates that beamforming is used by performing precoding for S symbols which will be transmitted from each antenna. For example, if rank of a channel is 1, the number of codewords is 1 and precoding is available, precoding may be performed for the S symbols generated for multi-antenna transmission.

At this time, an identity matrix may be included in a precoding matrix used for precoding, and a precoding matrix, which can maximize a receiving SNR, may be selected within a codebook. Referring to FIG. 10(b), the S symbols may be configured from a codeword 1, and the configured S symbols may be input to a precoder and mapped into each transmitting antenna.

FIG. 10(c) illustrates that space time coding is applied to S symbols which will be transmitted. For example, if the number of antennas is 2 or more, space time coding may be applied to the generated S symbols. Alamouti coding such as $$\begin{bmatrix} S_1 & -S_2^* \\ S_2 & S_1^* \end{bmatrix}$$

may be used as space time coding when the number of antennas is 2.

Although FIG. 10(c) illustrates that coding is performed based on space time block coding (STBC), coding may be performed using space and frequency region such as space frequency block coding (SFBC). Also, a transmitter may transmit the S symbols by coding for the S symbols using various SFBC/STBC schemes when the number of antennas is 3 or more.

3.3 Method for Configuring 'a' Symbols

The methods for configuring 'S' symbols in the above section 3.2 may equally be applied to configuration of 'a' symbols. That is, the 'a' symbols may be configured using (1) SM scheme, (2) precoding scheme or (3) space time coding scheme.

3.4 Method for Configuring Final HM Symbols

Final HM symbols may be generated using the 'S' symbols and the 'a' symbols configured through the above sections 3.2 and 3.3. For example, the HM symbols may be generated by adding the 'a' symbols based on the 'S' symbols. At this time, power scaling for allowing the 'S' symbol and the 'a' symbol to be spaced apart from each other as much as the distance r or d is not performed for the 'S' symbol and the 'a' symbol. Therefore, power scaling may be performed before final symbols are generated, whereby error sensitivity of each symbol may be set differently.

Figure 11:
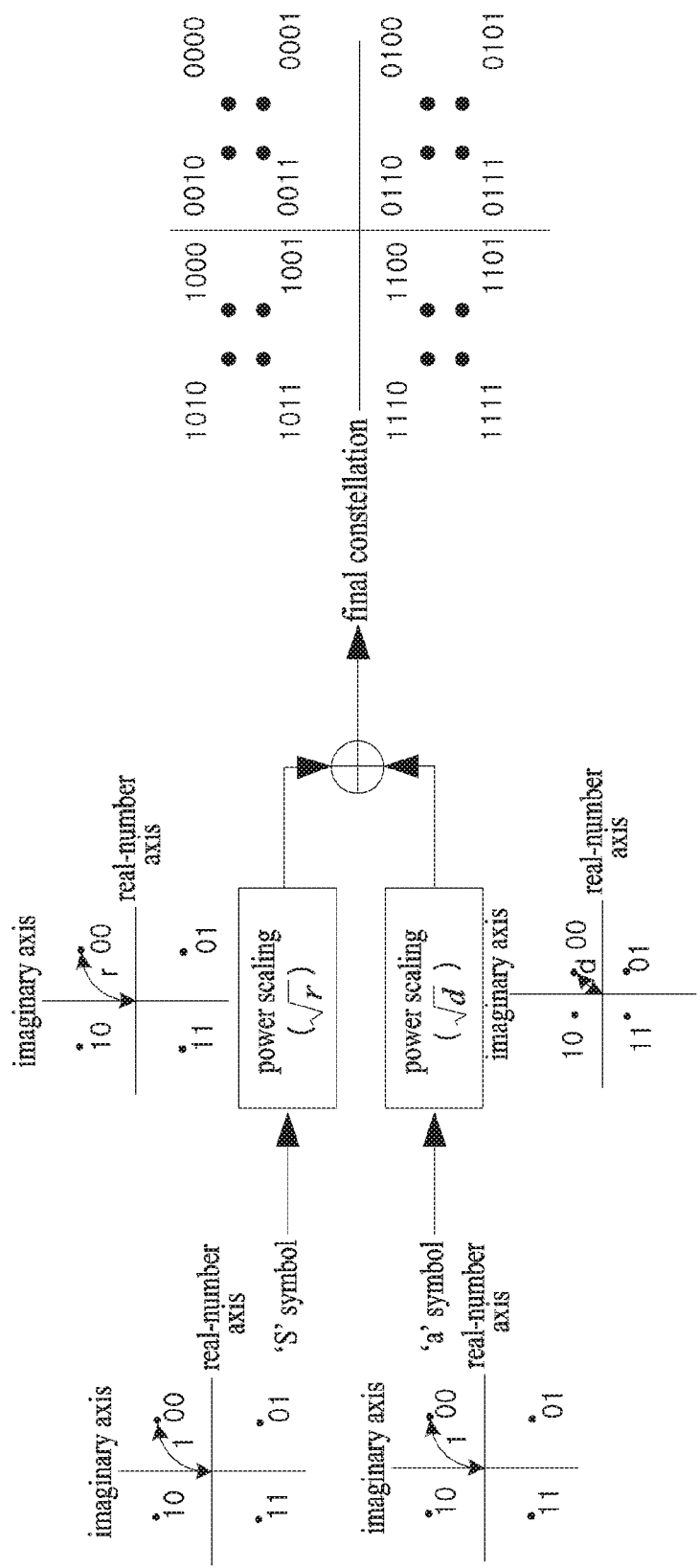
FIG. 11 illustrates one of methods for configuring final HM symbols.

FIG. 11 illustrates one of methods for configuring final HM symbols.

Referring to FIG. 11, the transmitter configures 'S' symbols and 'a' symbols, respectively. At this time, the 'S' symbols and the 'a' symbols may be generated based on the aforementioned methods for configuring symbols. Afterwards, power scaling is performed for the 'S' symbol to have a longer Euclidian distance 'r', ad power scaling is performed for the 'a' symbol to have a shorter Euclidian distance (r>d). The 'S' symbols and the 'a' symbols subjected to power scaling may be combined with each other to configure final HM symbols.

3.5 Method for Setting Information Bits

Figure 12:
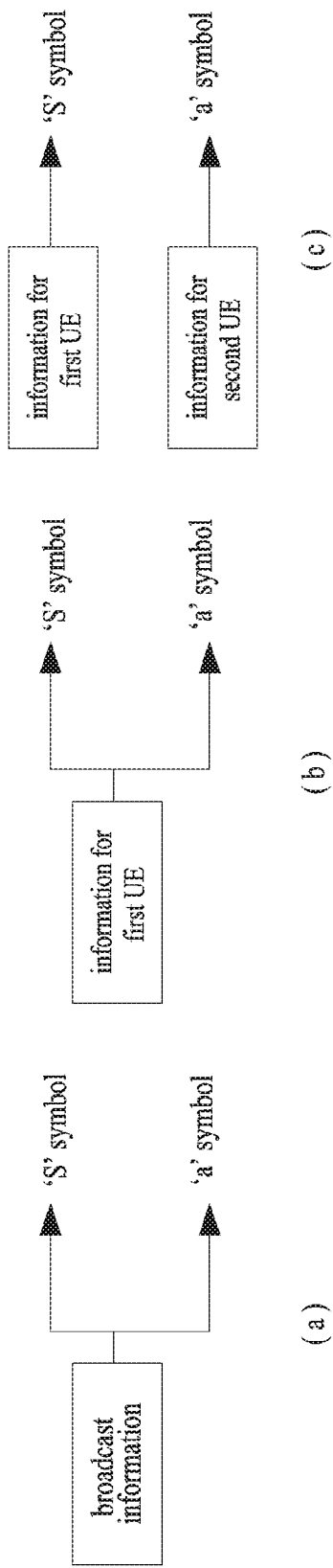

FIGS. 12 and 13 illustrate methods for configuring information bits constituting 'a' symbols and 'S' symbols.

The HM method may be used to transmit common information such as a broadcast channel and a common control channel. That is, same information bits such as broadcast information and common control channel information may be used as information bits of the 'S' symbols and the 'a' symbols (refer to FIG. 12(a)).

Alternatively, although the information bits for configuring the 'a' symbols may be those for the same user as that for the 'S' symbols, the information bits may be configured as those for another user different from that for the 'S' symbols (refer to FIG. 12(c)).

If the 'S' symbols and the 'a' symbols are configured by common information or information bits for the same user as shown in FIGS. 12(a) and (b), the transmitter may configure the 'S' and 'a' symbols by repeating the same information bits (refer to FIG. 13(a)), or may configure the 'S' and 'a' symbols by multiplexing the 'S' symbols and the 'a' symbols (refer to FIG. 13(b)).

3.6 Method for Transmitting and Receiving HM Symbols

The transmitter may transmit the HM symbols configured by combination of the aforementioned methods.

For example, it is assumed that the 'S' symbol and the 'a' symbol are generated using information bits only for one UE in the aforementioned methods. At this time, the transmitter may transmit the 'S' symbols by using beamforming and generate the 'a' symbols by using space time coding. In this case, the UE may acquire information with robustness in a LOS/non-LOS environment.

In other words, since the 'S' symbols have been transmitted in the LOS environment, the transmitter can acquire information at a high SNR, and can acquire information at a high SNR by obtaining diversity through the 'a' symbols in the non-LOS environment.

Otherwise, a receiver may acquire additional SNR gain through MRC scheme of information obtained using the 'S' symbols and information obtained using the 'a' symbols.

Otherwise, the transmitter may perform single data transmission of the 'S' symbols by using a first codeword (codeword 1) (for example, a case where precoding is performed using an identity matrix), and may perform beamforming for a final constellation of the 'a' symbols, which is formed using space time coding.

Although this section has been described based on the aforementioned example only, the methods described in the sections 3.2 to 3.5 may be applied to this section in combination.

As another aspect of the present invention, when the number of antennas of a transmitter (for example, base station) is 2 and the number of antennas of a receiver (for example, UE) is 1, a case where beamforming is performed for the 'S' symbols and space time coding (for example, STBC) is performed for the 'a' symbols will be described.

At this time, for convenience of description, it is assumed that a precoding matrix is $$W_1 = \frac{h_1^*}{\|h_1\|^2},$$

$$W_2 = \frac{h_2^*}{\|h_2\|^2}.$$

Also, $W_1$ means a precoding matrix for a first antenna, $W_2$ means a precoding matrix for a second antenna, $h_1$ means a channel during transmission through the first antenna, and $h_2$ means a channel during transmission through a second antenna.

Since the HM symbols are transmitted by beamforming and space time coding, the receiver receives the HM symbols for time intervals of at least two times. For example, a receiving signal $y_{t=1}$ received by the receiver for the first time interval may be expressed by the following Equation 1.

At this time, it is assumed that the receiver performs symbol detection by using a slicing function Q. The slicing function means a function that performs simple mapping of receiving symbols into the nearest constellation point by using one of hard decision methods.

$$y_{t=1} = [\,h_1\ \ h_2\,]\left(\begin{bmatrix} \frac{h_1^*}{\|h_1\|^2} \\ \frac{h_2^*}{\|h_2\|^2} \end{bmatrix} S_1 + \begin{bmatrix} a_1 \\ a_2 \end{bmatrix}\right) +$$

$$n_{t=1} = [\,h_1\ \ h_2\,]\left(\begin{bmatrix} W_1 \\ W_2 \end{bmatrix} S_1 + \begin{bmatrix} a_1 \\ a_2 \end{bmatrix}\right) +$$

$$n_{t=1} = [\,h_1\ \ h_2\,]\begin{bmatrix} W_1 S_1 + a_1 \\ W_2 S_1 + a_2 \end{bmatrix} + n_{t=1}$$

[Equation 1]

At this time, the Equation 1 may be arranged as expressed by the following Equation 2.

$$y_{t=1} = h_1 W_1 S_1 + h_1 a_1 + h_2 W_2 S_1 + h_2 a_2 + n_{t=1} =$$

$$2 S_1 + h_1 a_1 + h_2 a_2 + n_{t=1}$$

if $$Q\left(\frac{y_{t=1}}{2}\right) = S_1$$

[Equation 2]

At this time, the receiver can identify a quadrant of a constellation, from which the 'S' symbols are detected by applying the slicing function Q to the Equation 2.

Also, the receiver can derive the following Equation 3 based on the Equations 1 and 2.

$$\frac{y_{t=1}}{2} - Q\left(\frac{y_{t=1}}{2}\right) = h_1 a_1 + h_2 a_2 + n_{t=1} = p$$

[Equation 3]

The value of p derived from the Equation 3 is a value used to detect the 'a' symbols later.

The receiver receives a signal $y_{t=2}$ for the second time interval. The signal $y_{t=2}$ may be defined as expressed by the following Equation 4.

$$y_{t=2} = [\,h_1\ \ h_2\,]\left(\begin{bmatrix} \frac{h_1^*}{\|h_1\|^2} \\ \frac{h_2^*}{\|h_2\|^2} \end{bmatrix} S_2 + \begin{bmatrix} -a_2^* \\ a_1^* \end{bmatrix}\right) +$$

$$n_{t=2} = [\,h_1\ \ h_2\,]\left(\begin{bmatrix} W_1 \\ W_2 \end{bmatrix} S_2 + \begin{bmatrix} -a_2^* \\ a_1^* \end{bmatrix}\right) +$$

$$n_{t=2} = [\,h_1\ \ h_2\,]\begin{bmatrix} W_1 S_2 - a_2^* \\ W_2 S_2 + a_1^* \end{bmatrix} + n_{t=2}$$

[Equation 4]

At this time, the Equation 4 may be arranged as expressed by the following Equation 5.

$$y_{t=2} = h_1 W_1 S_2 - h_1 a_2^* + h_2 W_2 S_2 + h_2 a_1^* + n_{t=2} =$$

$$2 S_2 - h_1 a_2^* + h_2 a_1^* + n_{t=2}$$

if $$Q\left(\frac{y_{t=2}}{2}\right) = S_2$$

[Equation 5]

Also, the receiver may derive the following Equation 6 based on the Equations 4 and 5.

$$\frac{y_{t=2}}{2} - Q\left(\frac{y_{t=2}}{2}\right) = h_1 a_2^* + h_2 a_1^* + n_{t=2} = q$$

[Equation 6]

The value of q derived from the Equation 6 is a value used to detect the 'a' symbols later.

As described above, the receiver can determine the 'S' symbols transmitted by beamforming. That is, the receiver detects the 'S' symbols by using the slicing function Q. Afterwards, the receiver can detect the 'a' symbols by using addition and subtraction of the signals received for the first and second time intervals. The following Equation 7 expresses one of methods by which the UE detects the 'a' symbols.

$$h_1^* p + h_2 q^* = (|h_1|^2 + |h_2|^2) a_1 + h_1^* n_{t=1} + h_2 n_{t=2} = \hat{a}_1$$

$$h_2^* p - h_1 q^* = (|h_1|^2 + |h_2|^2) a_2 - h_1^* n_{t=2} + h_2 n_{t=1} = \hat{a}_2$$

$$Q\left(\frac{\hat{a}_1}{|h_1|^2 + |h_2|^2}\right) = a_1$$

$$Q\left(\frac{\hat{a}_2}{|h_1|^2 + |h_2|^2}\right) = a_2$$

[Equation 7]

The receiver can detect the 'S' symbols and the 'a' symbols through the Equations 1 to 7.

Figure 14:
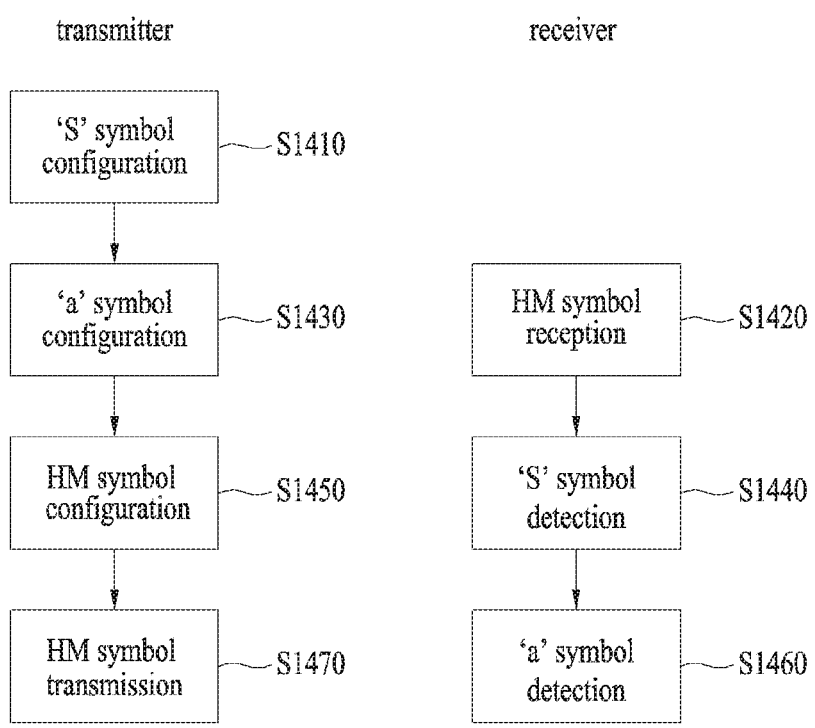
FIG. 14 briefly illustrates a method for transmitting and receiving HM symbols.

FIG. 14 briefly illustrates a method for transmitting and receiving HM symbols.

The transmitter may select control or data bits for configuring the HM symbols. Also, the transmitter may select a target for transmitting the HM symbols. Although this process is now shown in FIG. 14, it is preferable that this process is performed before the 'S' symbols are configured. Details of this process will be understood with reference to the section 3.5.

Afterwards, the transmitter configures the 'S' symbols as described in the section 3.2, and configures the 'a' symbols as described in the section 3.3 (S1410, S1430).

Also, the transmitter configures the HM symbols by means of combination of the 'S' symbols and the 'a' symbols. At this time, the transmitter performs power scaling for the 'S' symbols and the 'a' symbols. The details of power scaling will be understood with reference to the section 3.4. In respect of configuration of the HM symbols, (1) SM method, (2) beamforming method and (3) space time coding (e.g., STBC, SFBC, etc.) have been suggested in the embodiments of the present invention as methods for configuring the 'S' symbols. Also, (1) SM method, (2) beamforming method and (3) space time coding (e.g., STBC, SFBC, etc.) have been suggested in the embodiments of the present invention as methods for configuring the 'a' symbols. That is, since the HM symbols are configured by combination of the 'S' symbols and the 'a' symbols, the number of cases that can configure the HM symbols may be maximum 9 (S1450).

Finally, the transmitter transmits the configured HM symbols to the receiver (S1470).

In respect of transmission and reception of the HM symbols, in the case that the transmitter previously knows the transmission scheme of the HM symbols, the transmitter does not need to notify the receiver of information as to how the HM symbols have been configured. However, in the case that the HM symbols are configured dynamically or semi-statically, it is preferable that the transmitter previously notifies the receiver of the configuration method of the HM symbols.

Referring to FIG. 14, the receiver receives the HM symbols (S1420).

Afterwards, the receiver detects each of the 'S' symbols and the 'a' symbols from the HM symbols. For example, in the section 3.6, the receiver has transmitted and detected the 'S' symbols based on beamforming, and has transmitted and detected the 'a' symbols based on space time coding (S1440, S1460).

However, the embodiment disclosed in the section 3.6 is only exemplary. That is, the transmitter may transmit the 'S' symbols in accordance with space time coding and transmit the 'a' symbols in accordance with beamforming, and vice versa. In this way, the 'S' symbols and the 'a' symbols may be transmitted and received by various combinations of the methods described in the sections 3.2 and 3.3.

Also, in the embodiments of the present invention, since the 'S' symbols are configured to be robuster than the 'a' symbols, system information or control information may be transmitted for transmission of the 'S' symbols, and normal data may be transmitted for transmission of the 'a' symbols. Alternatively, same control information or same data may be transmitted for transmission of the 'S' and 'a' symbols. In this case, robust data transmission can be performed in an environment where a channel status is changed rapidly.

4. Apparatuses

Figure 15:
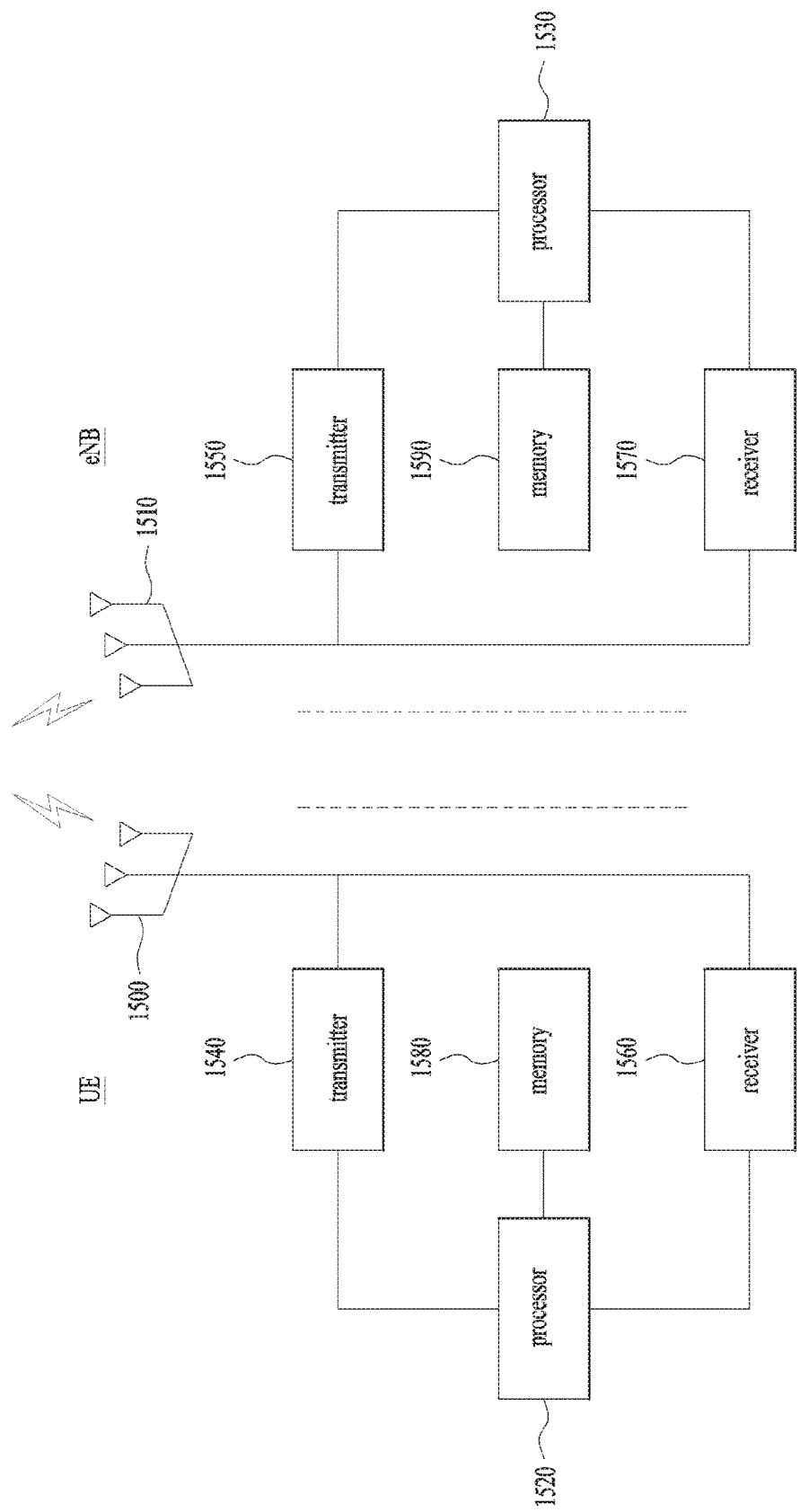
FIG. 15 illustrate a device through which methods described in FIG. 1 to FIG. 14 can be embodied.

Apparatuses illustrated in FIG. 15 are means that can implement the methods described before with reference to FIGS. 1 to 14.

A UE may act as a transmission end on UL and as a reception end on DL. An eNB may act as a reception end on UL and as a transmission end on DL.

That is, each of the UE and the eNB may include a transmitter (Tx) 1540 or 1550, and a receiver (Rx) 1550 or 1570, for controlling transmission and reception of information, data, and/or messages, and an antenna 1500 or 1510 for transmitting and receiving information, data, and/or messages. Although FIG. 15 illustrates that the number of antennas is 3, this is intended to illustrate a plurality of antennas, and two or more antennas may be provided in the UE or the eNB.

Each of the UE and the eNB may further include a processor 1520 or 1530 for implementing the afore-described embodiments of the present invention and a memory 1580 or 1590 for temporarily or permanently storing operations of the processor 1520 or 1530.

The embodiments of the present invention can be performed using the aforementioned components and functions of the UE and the eNB. For example, the processor of the UE or the eNB may configure 'S' symbols and 'a' symbols for configuring HM symbols, respectively, and may configure the HM symbols by means of combination of the 'S' and 'a' symbols. Afterwards, the processor of the eNB and the UE may transmit and/or receive the HM symbols by controlling the transmitter and the receiver. The detailed description of this process will be understood with reference to the disclosure of the section 3. Also, the embodiments of the present invention may be operated in the LTE/LTE-A system described in the sections 1 and 2, and may be applied to even a carrier aggregation environment.

The Transmitter and the Receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 15 may further include a low-power Radio Frequency (RF)/Intermediate Frequency (IF) module. In this case, the Transmitter and the Receiver may be called a transmitter and a receiver, respectively. If the Transmitter and the Receiver are used together, they may be called a transceiver.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1580 or 1590 and executed by the processor 1540 or 1530. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

What is claimed is:

1. A method for transmitting hierarchically modulated (HM) symbols in a wireless access system, the method comprising the steps of:

configuring a first symbol by applying a beamforming scheme;

configuring a second symbol by applying a space time coding scheme;

configuring the HM symbols by combining the first symbol and the second symbol; and transmitting the HM symbols, wherein the first symbol and the second symbol are combined by adding the second symbol to the first symbol, after performing a power scaling on the first symbol with a first euclidian distance 'r' and performing a power scaling on the second symbol with a second euclidian distance 'd', wherein r>d.

2. The method according to claim 1, wherein information bits modulated to the first symbol are different from information bits modulated to the second symbol.

3. The method according to claim 1, wherein information bits modulated to the first symbol are same as information bits modulated to the second symbol.

4. The method according to claim 1, wherein a receiver for information bits modulated to the first symbol is different from a receiver for information bits modulated to the second symbol.

5. A transmitter for transmitting hierarchically modulated (HM) symbols in a wireless access system, the transmitter comprising:

a transmitter; and a processor configuring and transmitting the HM symbols, wherein the processor is configured to:

configure a first symbol by applying a beamforming scheme, configure a second symbol by applying a space time coding scheme, configure the HM symbols by combining the first symbol and the second symbol, and transmit the HM symbols by controlling the transmitter, and wherein the first symbol and the second symbol are combined by adding the second symbol to the first symbol, after performing a power scaling on the first symbol with a first euclidian distance 'r' and performing a power scaling on the second symbol with a second euclidian distance 'd', wherein r>d.

6. The transmitter according to claim 5, wherein information bits modulated to the first symbol are different from information bits modulated to the second symbol.

7. The transmitter according to claim 5, wherein information bits modulated to the first symbol are same as information bits modulated to the second symbol.

8. The transmitter according to claim 5, wherein a receiver for information bits modulated to the first symbol is different from a receiver for information bits modulated to the second symbol.

* * * * *